United States Patent [19]

Hein

[11] Patent Number: 4,689,956
[45] Date of Patent: Sep. 1, 1987

[54] DRIVE SYSTEM COMPRISING AN ADJUSTABLE HYDROSTATIC MACHINE

[75] Inventor: Theo Hein, Lohr-Sendelbach, Fed. Rep. of Germany

[73] Assignee: Mannesmann Rexroth GmbH, Fed. Rep. of Germany

[21] Appl. No.: 858,198

[22] Filed: May 1, 1986

[30] Foreign Application Priority Data

May 11, 1985 [DE] Fed. Rep. of Germany ....... 3517104

[51] Int. Cl.$^4$ ............................................. F16D 31/02
[52] U.S. Cl. ......................................... 60/449; 60/445
[58] Field of Search .................. 60/445, 449; 417/218, 417/222; 91/459

[56] References Cited

U.S. PATENT DOCUMENTS

| | | | |
|---|---|---|---|
| 3,788,775 | 1/1974 | Leutner | 417/222 |
| 4,103,489 | 8/1978 | Fletcher et al. | 60/452 X |
| 4,274,257 | 6/1981 | Koch, Jr. et al. | 417/222 X |

Primary Examiner—Allen M. Ostrager
Attorney, Agent, or Firm—Harness, Dickey & Pierce

[57] ABSTRACT

For a drive system comprising a hydrostatic adjustable machine an electrical control is provided with which the actuator of the machine is driven so that for acceleration, retardation and braking, i.e. when the machine moves from motor mode to pump mode, a predetermined operating behavior of the machine necessarily results. The particular input desired value for the speed is transformed so that suddenly occurring abrupt acceleration, retardation and braking operations are avoided and in particular on abrupt entry of desired values increased safety against operating errors is achieved.

12 Claims, 1 Drawing Figure

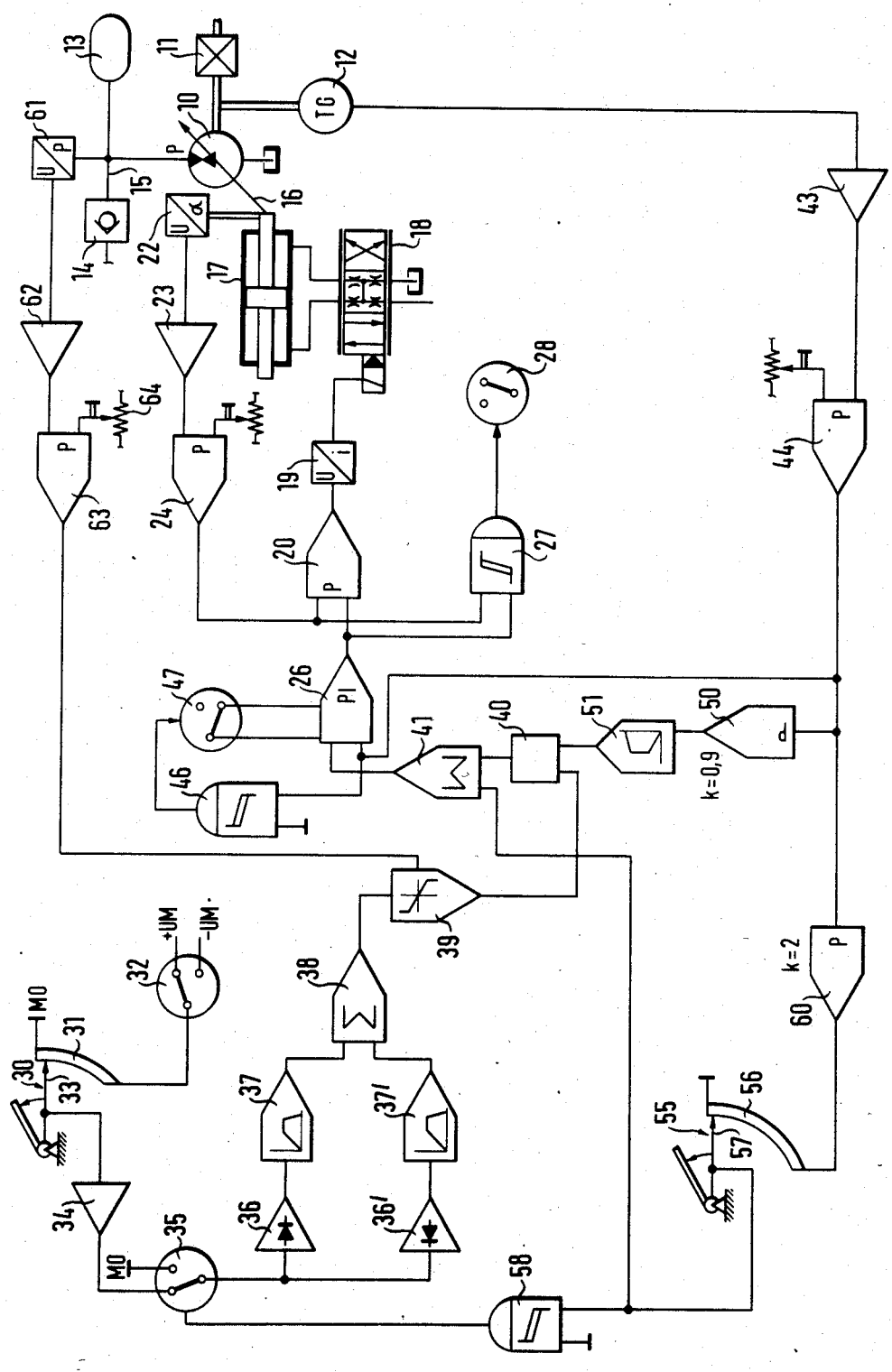

DRIVE SYSTEM COMPRISING AN ADJUSTABLE HYDROSTATIC MACHINE

The invention relates to a drive system comprising an adjustable hydrostatic machine having the features set forth in the preamble of claim 1. In a known drive system (DE-OS No. 3,302,546) the hydrostatic machine is provided for driving a vehicle, the adjustment of a predetermined speed being effected by means of a speed of rotation control which acts on the adjusting means of the hydrostatic machine. A hydraulic control flow proportional to the speed of rotation of the machine is generated in a hydrostatic tachogenerator and is divided into a desired flow flowing off at an adjustable throttle and a corresponding difference flow supplied to the adjusting cylinder of the machine.

In contrast to the aforementioned hydraulic speed of rotation control the control can also be effected by electrical means (No. P 34 41 185). The rotational speed desired value and the rotational speed actual value generated in a tachogenerator are supplied to an electronic speed controller. Connected to the controller is an electrically actuable servo valve by which the adjusting means is hydraulically actuated. An advantage of a drive having a hydrostatic machine is that the volume adjustment of the machine takes place relatively rapidly when the rotational speed desired value is changed. The hydrostatic machine has however the property that the machine is shifted beyond the zero point into the adjusting range in which the machine no longer operates as pump but as motor, i.e. is driven from the load and thereby greatly retards the load when on initiating a retardation operation the change of the rotational speed desired value which takes place is too rapid. Also, on acceleration of the load when the speed desired value is increased too much the acceleration torque of the machine can be so greatly increased that the load is abruptly accelerated. Also when retarding the machine, i.e. when the latter is moved from pump operation to motor operation to retard the load, jerky braking operations can also result.

The problem underlying the invention thus resides with arbitrarily initiated acceleration, retardation and braking operations, i.e. when corresponding desired values are entered, in controlling the adjustment of the hydraulic machine in such a manner that an improved, in particular safe, operating behaviour of the machine results.

Said problem is solved according to the invention by the features characterized in the claims, in which furthermore advantageous further developments of the invention are characterized.

The principle underlying the invention resides in deriving from the actual value speed of the hydrostatic machine measured in the tachogenerator a guide signal and supplying the modified guide signal as desired value to the speed controller. The modification of the guide signal automatically generates a delay or braking ramp with which the speed controller is fed so that the retardation operation or braking operation of the machine corresponds to the predetermined ramp if the desired value entry for the speed is changed too rapidly.

As long as the speed of the engine or machine is to be reduced the speed desired value signal is compared with the guide signal in the selection stage. If the desired value is reduced too greatly and thus the desired value signal applied to the selection stage becomes smaller than the guide signal, the desired value is blocked and the retardation of the machine is effected by the guide signal having a predetermined delay ramp.

In a retardation operation of the machine as well the speed desired value is blocked and a guide-signal-dependent braking signal generated which is also compared with the guide signal, the difference of the two signals being supplied to the speed controller. This prevents an excessive retardation of the machine being initiated with a small braking signal.

To avoid too rapid a change of the desired value signal on initiation of an acceleration operation, between the desired value input and selection stage an acceleration limiter stage is connected.

Thus, according to the invention, the driving of the speed controller is by a signal transformation of the desired values for the acceleration, retardation and braking. This gives an improved operational behaviour of the machine and in particular increased safety in the event of an operating error should the input of the desired values take place abruptly.

If the hydrostatic machine is used as driving engine, e.g. for a hydrobus, the invention achieves a further advantage in that the operating behaviour of a power drive with internal combustion engine is simulated on acceleration, retardation and braking. This results in an operating behaviour of the drive with hydrostatic machine similar to the operating behaviour with an internal combustion engine.

An example of embodiment of the invention will be explained in detail hereinafter with the aid of the drawings, the single Figure of which illustrates a signal flow diagram, for controlling a hydrostatic engine.

A hydrostatic machine 10 adjustable beyond the zero point into both adjustment ranges for pump and motor operation and comprising an adjustable volume is coupled to a transmission 11 for a travelling drive and a tachogenerator 12 furnishing an actual value signal of the rotational speed. The machine 10 is connected to a reservoir 13 and via a switching valve 14 to a pressure line 15 with impressed or load-independent pressure. The actuator 16 of the machine is connected to an adjusting cylinder 17 supplied with fluid by a servo valve 18. The servo valve 18 is electrically actuated via a driver stage 19 by a position controller for setting the actuator 16 of the machine 10 so that via the absorption or delivery volume of the machine 10 at a predetermined load torque a desired speed of rotation is achieved. On accelerating and in travelling operation the machine 10 operates as motor. For braking it moves through the zero point into the other adjusting range and operates as a pump driven by the travelling drive and conveying fluid to the store 13.

An actual value signal for the position of the actuator 16 is supplied to the position controller 20. For this purpose a displacement pickup or sensor 22, an impedance converter 23 and a voltage adapter are provided. The second input of the position controller 20 is subjected to the output signal of the speed controller 26. If the actual value of the position deviates by a predetermined amount from the desired value supplied by the speed controller 26, this is detected in a differential member 27 and displayed with a device 28. The differential member 27 comprises a predetermined delay to avoid premature indication. The position controller exhibits a proportional control behaviour because the adjustment of the machine is with an adjusting cylinder embodying an integral error. The integrating behaviour of the controlled system must therefore be compensated with a proportional behaviour of the controller. With the position control circuit outlined above the correct operation of the servo valve 18 is monitored. A jamming or soiling of the valve leads to an excessive deviation between the actual value and desired value and this is indicated.

A pickup 30 for accelerating and retarding the machine 10 consists of a potentiometer 31 which is connected via a reversing switch 32 for forward travel and reverse travel to a differently poled voltage source. The voltage tapped by a wiper 33 actuated in the manner of a gas pedal adjusts the desired value for the speed of rotation, which is applied to a summation member 38 via an impedance converter 34, a changeover switch 35 and optionally diodes 36, 36' and a limiting member 37, 37' and via a further limiting member 39, a selection stage 40 and a summation member 41 to the desired value input of the speed controller 26.

The diodes 36 and 36' are poled in the opposite sense to each other so that due to the different polarity of the voltage at the pickup 30 either the limiting member 37 for forward travel or the limiting member 37' for rearward travel is effective. If therefore the acceleration at the pickup 30 is too great the rise flank of the desired value will be too steep and the rise in the respective limiting stage 37 or 37' retarded to a predetermined value. This avoids that under a small load and high acceleration the machine 10 is abruptly accelerated.

The speed desired value furnished by the tachogenerator 12 is supplied via an impedance converter 43 and a voltage adapter 44 to the actual value input of the speed controller. From the supplied desired value and actual value of the speed the speed controller 26 generates a controlled variable which is entered in the position controller 20. The speed controller 26 has a proportional integrating behaviour. The integrating component can be disconnected via a delay stage, 46 and a switch 47 when the speed actual value is equal to zero. This avoids that due to its integrating behaviour the speed controller 26 adds up every extremely small speed deviation from zero until the controller output is large enough for driving the actuator 16 of the machine, so that the speed zero of the machine is reached. Since however the actuator is already in the stationary position the output signal of the speed controller would effect adjustment and thus starting of the machine. This is prevented by switching off the integral part of the controller when the machine is stationary.

The actual value signal of the tachogenerator 12 is also supplied via a multiplication member 50 and a limiting stage 51 to the second input of the selection stage 40. In the multiplication member 50 the speed actual value is reduced proportionally for example by the factor k =0.9 so that at the second input of the selection stage 40 there is always a guide signal which is 10% smaller than the speed actual value signal. The limiting stage flattens the actual value of the guide signal on pronounced changes of the actual value and thus serves to smooth the control operation.

If the desired value for the speed at the pickup 30 is reduced too rapidly the machine 10 has the property of shooting through zero into the other adjusting range in which it operates as pump and thereby exerts a braking torque on the load and this is undesirable on actuation of the pickup 30. If therefore the desired value present at the selection stage 40 becomes less than the guide signal by reducing the "pedal setting", the selection stage 40 blocks the desired value and selects the guide signal, applying only the latter to the speed controller 26. This means that the machine 10 slowly swings back because the guide signal is 10% less than the speed actual value; the speed of the machine drops further and this in turn results in a smaller input quantity for the speed controller 26. As long as the desired value signal input by the pickup 30 is suppressed in the selection stage 40 the retardation of the machine is therefore along a ramp which is defined by the guide signal and which arises automatically by the modification of the speed actual value in the multiplication stage 50, being predefined by the factor k thereof.

As long as the guide signal is less than the speed desired value, said signal is blocked by the selection stage 40 and the acceleration retardation is effected solely by the desired value at the pickup 30, possibly delayed in the limiting stages 37 and 37'.

For braking a further pickup 55 is provided whose resistance 56 is fed by a signal derived from the speed actual value in a multiplication stage 60. The multiplication stage 60 has for example a factor k =2. At a tap 57 actuated in the manner of a brake pedal a brake signal is thus derived which is supplied to the summation stage 41 and which in the example chosen can fluctuate between zero and twice the speed actual value voltage.

If the brake pickup 55 is actuated, via a delay member 58 an actuation of the switch 35 takes place for disconnecting the speed desired value signal. The brake signal set at the brake pickup 55 is compared in the summation stage 51 with the guide signal allowed to pass by the selection stage 40, and the difference between the two signals is formed. As long as the brake signal is greater than the guide signal, i.e. only slight braking takes place at the pickup 55, the output of the summation member 41 remains positive so that via the speed controller 26 and the position controller 20 the servo valve 18 and thus the actuator 16 is driven in the sense of returning the machine 10 to a smaller volume. On more pronounced braking, however, the brake signal tapped at the pickup 55 is increased until finally the brake signal reaches twice the value of the speed actual value so that the difference guide signal minus brake signal formed in the summation stage 41 becomes negative and thus the speed controller 26 is driven with a negative signal at its desired value input. This results in immediate return of the machine through the zero point so that a corresponding braking operation of the machine is initiated. The limiting stage 39 connected between the selection stage 40 and the pickup 30 is generated by a pressure-dependent signal. For this purpose the pressure in the pressure line 15 of the machine is measured in a pressure sensor 61 and led via an impedance converter 62 and a voltage adapter 63, at which a threshold value can be set via a potentiometer 64, to the limiting stage 39. If the pressure in the pressure line 15 drops by a predetermined value, in the stage 39 the desired value for the speed set at the pickup 30 is limited to a predetermined amplitude. Thus, with a relatively small pressure in the pressure line only a relatively small speed of rotation can be achieved.

What is claimed is:

1. Drive system comprising an adjustable hydrostatic machine which is connected to a pressure line and operating as motor or pump takes fluid from the pressure line or supplies fluid to said pressure line, having a directional valve for actuating the adjusting member of the hydrostatic machine for setting a rotational speed, comprising a rotational speed controller to which the speed actual value is supplied by a tachogenerator coupled to the machine and an arbitrarily settable speed desired value is supplied and which generates a control signal for driving the directional valve, characterized in that the desired value input of the speed controller (26) is preceded by a selection stage (40) to which the speed desired value and a guide signal derived from the speed actual value and lying beneath the speed actual value are supplied and that the selection stage switches the particular greater signal through to the desired value input of the speed controller.

2. Drive system according to claim 1, characterized in that the guide signal is formed in a multiplication member (50) connected to the tachogenerator.

3. Drive system according to claim 1, characterized in that between the multiplication member (50) and the selection stage (40) a limiting member (51) is connected.

4. Drive system according to claim 1, characterized in that the desired value input of the selection stage (40) is preceded by a limiting circuit (37, 37') by which the rate of change of the speed desired value is limited.

5. Drive system according to claim 4, characterized in that for each direction of rotation of the machine a limiting member (37, 37') is provided whose outputs are connected via a summation member (38) to the selection stage (40).

6. Drive system according to claim 1, characterized in that the desired value input of the selection stage (40) is preceded by a limiting circuit (9) by which in dependence upon the pressure in the pressure line (15) of the machine the set speed desired value can be varied.

7. Drive system according to claim 6, characterized in that the speed desired value when the pressure drops below a predetermined pressure is reduced to a predetermined value.

8. Drive system according to claim 1, characterized in that the desired value input of the speed controller (26) is preceded by a summation stage (41) to which the signal selected by the selection stage (40) and an arbitrarily settable braking signal can be supplied, that the braking signal is a signal derived from the speed actual value, lying above the speed actual value and modified by the brake pickup (55) and that the difference between the guide signal and the braking signal is supplied to the desired value input of the speed controller (26).

9. Drive system according to claim 8, characterized in that the signal supplied to the brake pickup (55) is formed in a multiplication member (60) connected to the tachogenerator (12).

10. Drive system according to claim 1, characterized in that on actuation of the brake pickup (55) the speed desired value signal is disconnected.

11. Drive system according to claim 1, characterized in that the speed controller (26) is a PI controller whose I component is adapted to be disconnected at a speed actual value equal to zero.

12. Drive system according to claim 1, characterized in that between the speed controller (26) and the directional valve (18) a position controller (20) is connected to which are supplied the output signal of the speed controller as desired value and as actual value the signal generated by a position pickup (22) disposed on the adjusting cylinder (17) of the machine for the control position of the latter, and that when the difference between the actual value and the desired value drops below a predetermined difference an indication of the excessive control deviation is effected.

* * * * *